3,268,509
[3,2-d]-PYRIMIDINE STEROIDS AND THE NUCLEOSIDES THEREOF
Pietro De Ruggieri, Carmelo Gandolfi, and Umberto Guzzi, Milan, Italy, assignors to Ormonoterapia Richter S.p.A., Milan, Italy
No Drawing. Filed July 6, 1964, Ser. No. 380,625
Claims priority, application Italy, July 5, 1963, 14,025/63
14 Claims. (Cl. 260—211.5)

This invention relates to [3,2-d]-pyrimidines of the androstane, estrane and cholestane series, substituted or unsubstituted in the 3' position, and having the general formula:

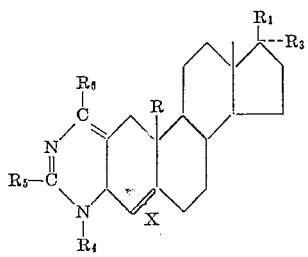

wherein R is a member selected from the group consisting of H and $CH_3$, $R_1$ is a member selected from the group consisting of $C_8H_{17}$ and $OR_2$ (wherein $R_2$ is a member selected from the group consisting of hydrogen and aliphatic acid radicals having from 2 to 10 carbon atoms), $R_3$ is a member selected from the group consisting of hydrogen and lower alkyl radicals, $R_4$ is a member selected from the group consisting of hydrogen, alkyl radicals having from 1 to 6 carbon atoms, and phenyl, glycosyl, ribosyl, 2'-desoxyribosyl, 2', 3',5'-tri-O-benzoyl-ribosyl, and 3',5'-di-O-benzoyl-2'-desoxyribosyl radicals, $R_5$ is a member selected from the group consisting of hydrogen, $NH_2$, OH, SH, Cl, S lower alkyl, O lower alkyl, lower alkyl and N(lower alkyl)$_2$ radicals, $R_6$ is a member selected from the group consisting of H, $NH_2$, SH, OH, Cl, O lower alkyl and N(lower alkyl)$_2$ radicals and X is a member selected from the group consisting of single and double bonds.

Of course, the intermediate compounds for obtaining said pyrimidines, and the tautomeric forms of the ring and of the substituents on the pyrimidine ring, such as oxo or hydroxy, thio or mercapto, imino or amino, if they exist, are also included in the invention.

Such compounds, which derive from the fusion of the pyrimidine nucleosides with the steroid molecule, are useful in therapy as antibacterial, anti-virus, and anti-hypertension agents, in cardiovascular diseases, hyperlipidemia and as hypophysis gonadotropine inhibitors.

Suitable starting materials for the preparation of the compounds of the invention are the compounds claimed in the copending applications Serial Nos. 380,626 and 380,640, filed of even date herewith.

The following examples further illustrate the invention but do not limit it in any way.

Example 1.—6'-hydroxy-[3,2-d]-pyrimidine-cholestane 0.6 part of 2-(carboxylic acid-amide)-3-N-(ethoxymethylidene)-amino-cholest-2-ene were treated with 15 parts of ethanol saturated with ammonia in an autoclave at 120° C. for 8 hours.

The reaction mixture was concentrated and filtered. After crystallization from acetone-methanol, 0.41 part of 6' - hydroxy-[3,2-d]-pyrimidine-5α-cholestane were obtained. Said product was also obtained by heating 0.3 part of a solution of 2-(carboxylic acid-amide)-3-N(amino-methylidene)-amino-cholest-2-ene in 10 parts of a 1.2 N ethanol solution of ammonia in an autoclave for 2 hours.

On cooling, 0.23 parts of 6'-hydroxy-[3,2-d]-pyrimidine-cholestane were obtained.

Example 2.—6'-hydroxy-[3,2-d]-pyrimidine-17α-methyl-5α-androstane-17β-ol 0.5 part of 2-(carboxylic acid-amide)-3-N-(ethoxymethylidene) - amino - 17α-methyl-5α-androst-2-ene-17β-ol were treated with 20 parts of ethanol saturated with ammonia in an autoclave at 125° C. The reaction mixture was concentrated. 0.36 part of 6'-hydroxy-[3,2-d]-pyrimidine - 17α-methyl-5α-androstane-17β-ol were obtained.

Example 3.—6'-hydroxy-[3,2-d]-pyrimidine-17β-acetoxy-5α - androstane and 6'-hydroxy-[3,2-d]-pyrimidine-5α-androstane-17β-ol 0.8 part of 2-(carboxylic acid-N-formyl-amide)-3-amino-17β-acetoxy-5α-androst-2-ene were refluxed for 30 minutes with 10 parts of ethylene glycol. The reaction mixture was cooled, diluted with water and filtered, to give 0.62 parts of 6'-hydroxy-[3,2-d]-pyrimidine-17β-acetoxy-5α-androstane. 0.3 part of said compound were refluxed for 1.5 hours with 25 parts of a 1.5% ethanol solution of $KHCO_3$. Upon dilution with water and subsequent crystallization from methylene chloride-isopropyl alcohol, 0.17 part of 6'-hydroxy-[3,2-d]-pyrimidine-5α-androstane-17β-ol were obtained.

Example 4.—2' - methyl-6'-hydroxy-[3,2-d]-pyrimidine-17α-methyl-5α-androstane-17β-ol 1.3 parts of 2-(carboxylic acid-N-acetyl-amide)-3-amino-17α-methyl-5α-androst-2-ene-17β-ol were refluxed for 2.5 hours in ethanol. The reaction mixture was concentrated and filtered to give 1.21 parts of 2'-methyl-6'-hydroxy - [3,2-d] - pyrimidine-17α-methyl-5α-androstane-17β-ol.

Example 5.—2'-methyl-6'-hydroxy-[3,2-d]-pyrimidine-5α-androstane-17β-ol 2.1 parts of 2-(carboxylic acid-N-acetyl-amide)-3-amino-17β-acetoxy-5α-androst-2-ene in 50 parts of ethanol were refluxed for 2.5 hours. The reaction mixture was concentrated and filtered to give 1.8 parts of 2'-methyl-6'-hydroxy - [3,2-d]-pyrimidine-17β-acetoxy-5α-androstane. 0.8 part of said product in 40 parts of a 1.5% $KHCO_3$ solution were refluxed for 2.5 hours. The reaction mixture was concentrated, diluted with water and filtered to give a product that after crystallization from methylene chloride-ethyl acetate yielded 0.51 part of 2'-methyl-6'-hydroxy-[3,2-d]-pyrimidine-5α-androstane-17β-ol.

Example 6.—6' - hydroxy-[3,2-d]-pyrimidine-androst-4-ene-17β-ol

A solution of 0.5 part of 2-(carboxylic acid-amide)-3-N - (ethoxy-methylidene)-amino-androsta-2,4-diene-17β-ol in 20 parts of ethanol saturated with ammonia was refluxed in an autoclave for 4 hours. The reaction mixture was concentrated to a small volume and filtered to give 0.33 part of 6'-hydroxy-[3,2-d]-pyrimidine-androst-4-ene-17β-ol.

Example 7.—6'-hydroxy-[3,2-d]-pyrimidine-cholest-4-ene

Following the procedure of the preceding example, from 0.8 part of 2-(carboxylic acid-amide)-3-N-(ethoxymethylidene) - amino - cholesta - 2,4 - diene, 0.57 part of 6' - hydroxy - [3,2-d] - pyrimidine - cholest - 4 - ene were obtained.

Example 8.—6'-hydroxy-[3,2-d]-pyrimidine-estr-4-ene 17β-ol

Following the procedure of Example 6, from 0.8 part of 2 - (carboxylic acid - N - methyl - amide) - 3 - N-

(ethoxy - methylidene) - amino - estra - 2,4 - diene-17β - ol 0.33 part of 6' - hydroxy - [3,2 - d] - pyrimidine estr-4-ene-17β-ol were obtained.

*Example 9.—2',6'-dihydroxy-[3,2-d]-pyrimidine-5α-estrane-17β-ol*

A suspension of 1.8 parts of 2-(carboxylic acid-amide)-3 - N - (ethoxy - carboyl) - amino - 5α - estra - 2,4-diene-17β-ol in 30 parts of ethanol saturated with ammonia was heated in an autoclave for 8 hours at 120° C. First the reaction product dissolved completely and then crystallized in part. Upon concentration and filtration, 1.12 parts of 2',6' - hydroxy - [3,2 - d] - pyrimidine-5α-estrane-17β-ol were obtained.

*Example 10.—2',6'-dihydroxy-[3,2-d]-pyrimidine-5α-androstane-17β-ol*

2.2 parts of 2 - (carboxylic acid - N - (ethoxy - carboyl) amide) - 3 - amino - 5α - androst - 2 - ene - 17β - ol were dissolved in 22 parts of a 2.5% methanol solution of potassium hydroxide. The resulting solution was kept at room temperature for 20 minutes, neutralized with 15% acetic acid, diluted with water and filtered. After crystallization from ethyl acetate, 1.84 parts of 2',6'-dihydroxy - [3,2 - d] - pyrimidine - 5α - androstane - 17β-ol were obtained; $[\alpha]_D = +70°$ (pyridine);

$$\lambda_{max.}^{MeOH} 263 \text{ m}\mu; \epsilon = 5{,}500$$

Said product was also obtained starting with a suspension of 1.3 parts of 2 - (carboxylic acid - amide) - 3 - N-(carbamide) - amino - 5α - androst - 2 - ene - 17β - ol in 20 parts of ethanol saturated with ammonia following the procedure of the above Example 9.

*Example 11.—2',6'-hydroxy-[3,2-d]-pyrimidine-cholestane*

1.3 parts of 2 - (carboxylic acid - N - (ethoxy - carboyl) - amide) - 3 - amino - cholest - 2 - ene were refluxed with 15 parts of a 4.2 N ethanol solution of ammonia. The reaction mixture was concentrated and filtered to give 0.93 part of 2',6'-hydroxy-[3,2-d]-pyrimidine-cholestane.

*Example 12.—2',6'-dihydroxy-[3,2-d]-pyrimidine-17α-methyl-androst-4-ene-17β-ol*

1.3 parts of 2 - (carboxylic acid - amide) - 3 - N-(ethoxy - carboyl) - amino - 17α - methyl - androsta-2,4-diene-17β-ol were suspended in 20 parts of ethanol saturated with ammonia and heated in an autoclave at 120° C. for 7 hours. The reaction product dissolved completely. Upon concentration of the solution, needle crystals were formed which were filtered to give 0.73 part of 2',6' - dihydroxy - [3,2 - d] - pyrimidine - 17α - methyl-androst-4-ene-17β-ol.

*Example 13.—2',6'-dihydroxy-[3,2-d]-pyrimidine-cholest-4-ene*

Following the procedure of the above Example 12, from 1 part of 2 - (carboxylic acid - amide) - 3 - N-(carbamide) - amino - cholesta - 2,4 - diene, 0.52 part of 2',6' - dihydroxy - [3,2 - d] - pyrimidine - cholest - 4-ene were obtained.

*Example 14.—2' - hydroxy - 6' - amino - [3,2 - d]-pyrimidine-cholestane*

6.18 parts of 2-cyano-cholestane-3-one were heated in an autoclave for 9 hours with 50 parts of ethanol and 1.9 parts of ammonium formate at 120° C. The reaction mixture was cooled and, after crystallization from ethyl acetate, 5 parts of 2 - cyano - 3 - amino - cholest - 2-ene were obtained; M.P. 215–216° C.; $[\alpha]_D = +78°$.

0.92 part of said product were refluxed with 55 parts of toluene, 0.47 part of potassium carbonate and 0.65 part of ethyl chlorocarbonate.

After 3 hours, the reaction mixture was cooled, washed with water and evaporated to dryness. After crystallization from sulphuric ether, 0.3 part of 2-cyano-3-amino-cholest-2-ene were recovered. The mother liquor was evaporated to dryness to give, after crystallization from methanol, 0.46 part of 2 - cyano - 3 - N - (ethoxy-carboyl)-amino-cholest-2-ene; M.P. 118–120° C.

0.4 part of the latter product were treated with 15 parts of ethanol saturated with ammonia in an autoclave for 12 hours at 120° C. to give 0.33 part of 2'-hydroxy-6'-amino-[3,2-d]-pyrimidine-cholestane; M.P. >350°;

$\lambda_{max.}^{EtOH} 275 \text{ m}\mu; \epsilon = 5.750; \lambda_{max.}^{EtOH.HCl} 278 \text{ m}\mu; \epsilon = 9200;$ $\lambda_{max.}^{EtOH.NaOH} 281 \text{ m}\mu; \epsilon = 6{,}200$

*Example 15.—2'-hydroxy-6'-amino-[3,2-d]-pyrimidine-17α-methyl-5α-androstane-17β-ol*

4 parts of 2 - cyano - 17α - methyl - 5α - androstane-17β-ol-3-one in 125 parts of ethanol were treated in an autoclave with 1.5 parts of ammonium formate for 8 hours at 130° C.

The reaction mixture was concentrated, diluted with water and filtered. After crystallization from CH₂Cl₂-methanol, 3.57 parts of 2 - cyano - 3 - amino - 17α-methyl - 5α - androst - 2 - ene - 17β - ol were obtained; M.P. 265–267° C.

A portion of the latter product was refluxed while stirring with 30 parts of toluene, 0.95 part of potassium carbonate and 1.3 parts of ethyl chlorocarbonate for 6 hours. The reaction mixture was cooled, washed with water and evaporated to dryness. After crystallization from methanol, 0.65 part of 2 - cyano - 3 - N - (ethoxy-carboyl) - amino - 17α - methyl - androst - 2 - ene-17β-ol were obtained; M.P. 148–150° C.

0.53 part of the latter product were heated in an autoclave at 130° C. with 20 parts of ethanol saturated with ammonia. The reaction mixture was then concentrated to give 0.44 part of 2'-hydroxy-6'-amino-[3,2-d]-pyrimidine-17α-methyl-5α-androstane-17β-ol.

*Example 16.—6'-mercapto-[3,2-d]-pyrimidine-cholestane*

A solution of 0.7 part of 6'-hydroxy-[3,2-d]-pyrimidine-cholestane in 30 parts of pyridine was refluxed for 6 hours with 1.35 parts of $P_2S_5$ while stirring.

The reaction mixture was cooled, poured into water and filtered. The crude product was dissolved in methylene chloride and the resulting solution was decolorized with charcoal, filtered, and concentrated. After crystallization from methylene chloride-methanol, 0.56 part of 6' - mercapto - [3,2-d] - pyrimidine - cholestane were obtained.

*Example 17.—6'-amino-[3,2-d]-pyrimidine-cholestane*

A solution of 0.45 part of the product described in the preceding example in 25 parts of ethanol saturated with ammonia was heated in an autoclave for 48 hours, concentrated, diluted with water and filtered to give, after crystallization from methanol, 0.15 part of 6'-amino-[3,2-d]-pyrimidine-cholestane.

Said product was also obtained starting with 2-cyano-3-amino-cholest-2-ene as follows: To 3 parts of 2-cyano-3-amino-cholest-2-ene in 16 parts of dioxane, 4 parts of ethyl orthoformate and 0.080 part of p-toluenesulphonic acid were added. After 12 hours at room temperature, 2.3 parts of 2-cyano-3-N-(ethoxy-methylidene)-amino-cholest-2-ene were recovered; M.P. 168–170° C.

2.2 parts of the latter product in 80 parts of ethanol saturated with ammonia were heated in an autoclave at 120° C. for 8 hours. The reaction mixture was filtered to give 1.85 parts of 6'amino-[3,2-d]-pyrimidine-cholestane; M.P. 218–221° C.; $[\alpha]_D = +53°$ (chloroform).

*Example 18.—2',6'-dihydroxy-3'-butyl-[3,2-d]-pyrimidine-5α-androstane-17β-ol*

A solution of 0.9 part of 2-(carboxylic acid-N-(ethoxy-carboyl) - amide) - 3 - N - butyl - amino - 5α - androst-2-ene-17β-ol in 20 parts of ethylene glycol was refluxed for 4 hours, diluted with water and filtered to give, after crystallization from ethyl acetate, 0.63 part of 2',6'-dihydroxy - 3' - butyl - [3,2 - d] - pyrimidine - 5α - androstane-17β-ol; M.P. 290–292° C;

$$\lambda_{max.}^{EtOH} \ 273 \ m\mu; \ \epsilon = 9{,}700$$

*Example 19.—2',6'-dihydroxy-3'-pentyl-[3,2-d]-pyrimidine-17β-acetoxy-5α-androstane*

A solution of 2.4 parts of 2 - (carboxylic acid - (N-ethoxy - carboyl) - amide) - 3 - N - pentyl - amino - 5α-androst - 2 - ene - 17β - ol in 40 parts of ethylene glycol was refluxed for 4 hours and filtered to give, after crystallization from methanol, 1.95 parts of 2',6' - dihydroxy-3' - pentyl - [3,2 - d] - pyrimidine - 5α - androstane-17β-ol; M.P. 236–238° C.; [α]$_D$=+74° (chloroform).

1.2 parts of said product were acetylated with 4.8 parts of pyridine and 2.4 parts of acetic anhydride overnight at room temperature. The reaction mixture was diluted with water and filtered to give 1.280 parts of 2',6' - dihydroxy - 3' - pentyl - 5α - androstane - 17β - acetoxy-[3,2-d]-pyrimidine; M.P. 309° C.; [α]$_D$=+60° (CHCl$_3$).

*Example 20.—2'-hydroxy-6'-mercapto-3'-pentyl-[3,2-d]-pyrimidine-17β-acetoxy-5α-androstane*

0.47 part of 2',6'-dihydroxy-3'-pentyl-[3,2-d]-pyrimidine-17β-acetoxy-5α-androstane in 20 parts of pyridine were refluxed with 0.9 part of P$_2$S$_5$.

Upon dilution with water and crystallization from methanol, 0.38 part of 2' - hydroxy - 6' - mercapto - 3'-pentyl - [3,2 - d] - pyrimidine - 17β - acetoxy - 5α - androstane were obtained; M.P. 285–287° C.; [α]$_D$=+42° (chloroform).

*Example 21.—2'-hydroxy-6'-amino-3'-pentyl-[3,2-d]-pyrimidine-5α-androstane-17β-ol and 17β-acetoxy*

0.6 part of 2'-hydroxy-6'-mercapto-3'-pentyl-[3,2-d]-pyrimidine-17β-acetoxy-5α-androstane in 40 parts of ethanol saturated with ammonia were heated for 48 hours in an autoclave at 120° C. The reaction mixture was concentrated, diluted with water and filtered to give, after crystallization from methanol, 0.19 part of 2'-hydroxy-6' - amino - 3' - pentyl - [3,2 - d] - pyrimidine - 17β-acetoxy-5α-androstane; M.P. 260–262° C.; [α]$_D$=+73°.

The mother liquor was refluxed for 1 hour with 15 parts of a 1% ethanol solution of potassium carbonate. The reaction mixture was concentrated, diluted and filtrated to give, after crystallization from methanol, 0.18 part of 2' - hydroxy - 6' - amino - 3' - pentyl - [3,2 - d]-pyrimidine-5α-androstane-17β-ol; M.P. >300° C.

*Example 22.—2'-hydroxy-6'-amino-3'-butyl-[3,2-d]-pyrimidine-cholestane*

2.35 parts of 2 - (carboxylic acid - N - (ethoxy - carboyl) - amide) - 3 - N - butyl - amino - cholest - 2 - ene in 20 parts of ethylene glycol were refluxed for 3 hours. The reaction mixture was then diluted with water and filtered to give 2.12 parts of 2',6'-dihydroxy-3'-butyl-[3,2-d]-pyrimidine-cholestane. 1.9 parts of the latter compound were refluxed in 50 parts of pyridine with 2.8 parts of P$_2$S$_5$ for 5 hours. The reaction mixture was then diluted with water, filtered and extracted with methylene chloride. The methylene chloride solution was then decolorized with charcoal and evaporated to dryness to give, after crystallization from methanol, 1.92 parts of 2'-hydroxy - 6' - mercapto - 3' - butyl - [3,2 - d] - pyrimidine-cholestane.

1.3 parts of the latter compound were kept for 48 hours in an autoclave at 120° C. with 80 parts of ethanol saturated with ammonia to give, following the procedure of Example 21, 0.81 part of 2'-hydroxy-6'-amino-3'-butyl-[3,2-d]-pyrimidine-cholestane.

*Example 23.—2'-hydroxy-6'-amino-3-n-hexyl-[3,2-d]-pyrimidine-5α-estrane-17β-ol*

Following the procedure of Example 23, the following compounds were obtained starting with 2 - (carboxylic acid - N - (ethoxy - carboyl) - amide) - 3 - N - (n - hexyl)-amino-estr-2-ene-17β-ol:

2',6'-dihydroxy-3'-n-hexyl-[3,2-d]-pyrimidine-5α-estrane-17β-ol;
2',6'-dihydroxy-3'-n-hexyl-[3,2-d]-pyrimidine-17β-acetoxy-5α-estrane (by acetylation according to Example 19);
2' - hydroxy - 6'-mercapto-3'-n-hexyl-[3,2-d]-pyrimidine-17β-acetoxy-5α-estrane;
2' - hydroxy-6'-amino-3'-n-hexyl-[3,2-d]-pyrimidine-17β-acetoxy-5α-estrane;
2' - hydroxy - 6'-amino-3'-n-hexyl-[3,2-d]-pyrimidine-5α-estrane-17β-ol.

*Example 24.—2'-hydroxy-6'-chloro-3-n-hexyl-[3,2-d]-pyrimidine-5α-estrane-17β-ol-17-acetate*

4.3 parts of 2'-hydroxy-6'-amino-3-n-hexyl-[3,2-d]-pyrimidine-5α-estrane-17β-acetoxy where dissolved in 80 parts of concentrated hydrochloric acid. After cooling to −15° C., to the above solution 1.38 parts of sodium nitrite in 8 parts of water were added dropwise while keeping the temperature at −10° to −15° C. within a forty-minute period.

The resulting solution was stirred for an additional hour and then carefully neutralized to pH 7 with a 25% sodium hydroxide solution, while keeping the temperature at −8° to −3° C. The reaction mixture was filtered and the product was washed repeatedly on the filter, dissolved in methylene chloride and crystallized from methylene chloride-acetone to give 1.36 parts of 2'-hydroxy-6'-chloro - 3' - n-hexyl-[3,2-d]-pyrimidine-5α-estrane-17β-ol-17-acetate.

*Example 25.—2'-hydroxy-6'-dimethyl-amino-3'-n-hexyl-[3,2-d]-pyrimidine-5α-estrane-17β-ol*

In a bomb, a suspension of 0.92 part of 2'-hydroxy-6'-chloro-3'-n-hexyl-[3,2-d]-pyrimidine-5α-estrane-17β-ol in 30 parts of ethanol saturated with dimethyl-amine was kept at 120° C. for 8 hours. The reaction mixture was concentrated, diluted with water and filtered to give, after crystallization from methylene chloride-ethyl acetate, 0.67 part of 2'-hydroxy-6'-dimethylamino-3'-n-hexyl-[3,2-d]-pyrimidine-5α-estrane-17β-ol.

*Example 26.—2'-hydroxy-6'-chloro-3'-n-butyl-[3,2-d]-pyrimidine-cholestane*

Following the procedure of Example 24, 1.33 parts of 2'-hydroxy-6'-chloro-3'-n-butyl-[3,2-d]-pyrimidine-cholestane were obtained starting with 2.8 parts of 2'-hydroxy-6'-amino-3'-n-butyl-[3,2-d]-pyrimidine-cholestane.

*Example 27.—2'-mercapto-6'hydroxy-[3,2-d]-pyrimidine-cholest-4-ene*

0.4 part of N-2-[3-n-butoxy-cholesta-2,4-diene]-carboyl-thiourea were refluxed for 10 minutes with 15 parts of a 0.25% ethanol solution of potassium hydroxide. The reaction mixture was concentrated, neutralized with 15% acetic acid and diluted with water to give, after crystallization from methanol, 0.23 part of 2'-mercapto-6'-hydroxy-[3,2-d]-pyrimidine-cholest-4-ene.

*Example 28.—2'-mercapto-6'-hydroxy-3'butyl-[3,2-d]-pyrimidine-cholest-4-ene*

0.715 part of N-2-[3-n-butoxy-cholesta-2,4-diene]-carboyl-N'-butyl-thiourea were heated on a water bath for 30 minutes with 20 parts of ethanol containing 0.1 part of triethylamine. The reaction mixture was concentrated until a small volume was reached to give 0.23 part of 2'-mercapto - 6'-hydroxy-3'-butyl-[3,2-d]-pyrimidine-cholest-4-ene.

*Example 29.—2'-6'-dimercapto-3'-butyl-[3,2-d] pyrimidine-cholest-4-ene*

According to Example 20, 0.4 part of 2'-mercapto-6'- hydroxy-3'-butyl-[3,2-d]-pyrimidine-cholest-4-ene were refluxed with $P_2S_5$ in pyridine to give 0.29 part of 2',6'-dimercapto-3'-butyl-[3,2-d]-pyrimidine-cholest-4-ene.

*Example 30.—2'-mercapto-6'-amino-3'-butyl-[3,2-d]-pyrimidine-cholest-4-ene*

0.2 part of 2',6'-dimercapto-3'-butyl-[3,2-d]-pyrimidine-cholest-4-ene were heated for 24 hours in an autoclave at 120° C. with 10 parts of ethanol saturated with ammonia. The reaction mixture was concentrated until a small volume was reached, diluted and filtered to give, after crystallization from methylene chloride-ethyl acetate, 0.11 part of 2-mercapto-6-amino-3'-butyl-[3,2-d] pyrimidine-cholest-4-ene.

*Example 31.—2'-mercapto-6'-hydroxy-3'-ethyl-[3,2-d]-pyrimidine-estr-4-ene-17β-ol*

0.32 part of N-2-[3-n-butoxy-estra-2,4-diene-17β-ol]-carboyl-N'-ethyl-thiourea in 20 parts of a 1.25 N ethanol solution of sodium hydroxide were heated for 15 minutes on a water bath until a clear solution was obtained. This was acidified and the solid filtered off. 2'-mercapto-6'-hydroxy-3'-ethyl-[3,2-d]-pyrimidine-estr-4-ene-17β-ol (0.17 part) crystallized from ethanol as laths.

*Example 32.—2'-mercapto-6'-hydroxy-3'-methyl-[3,2-d]-pyrimidine-17α-methyl-androst-4-ene-17β-ol*

Following the procedure of Example 31, 0.34 part of 2'-mercapto-6'-hydroxy-3'-methyl-[3,2-d]-pyrimidine-17α-methyl-androst-4-ene-17β-ol were obtained starting with 0.52 part of N-2-[3-n-butoxy-17α-methyl-androsta-2,4-diene-17β-ol]-carboyl-2'-methyl-thiourea.

*Example 33.—2',6'-dihydroxy-3'-(2'', 3'', 5''-tri-O-benzoyl-β-D-ribofuranosyl)-[3,2-d]-pyrimidine-5α-androstane-17β-ol.*

0.95 part of 2-(carboxylic acid-N-(ethoxy-carboyl)-amide)-5α-androstane-17β-ol-3-one, 0.95 part of 2,3,5-tri-O-benzoyl-β-D-ribofuranosyl-amine hydrochloride and 3 parts of triethylamine in 90 parts of ethyl acetate were refluxed for 1.5 hours. The reaction mixture was washed with water and evaporated to dryness. Through chromatography on a silica gel column, 1.02 parts of 2',6'-dihydroxy-3'-(2'',3'',5''-tri-O-benzoyl-β-D-ribofuranosyl)-[3,2-d]-pyrimidine-5α-androstane-17β-ol $$\lambda_{max.}^{EtOH} \ 272 \ m\mu; \ \epsilon = 9,350$$

were obtained from 90/10 benzene/ethyl acetate fractions.

*Example 34.—2',6'-dihydroxy-3'-β-D-ribofuranosyl-[3,2-d]-pyrimidine-5α-androstane-17β-ol*

0.5 part of 2-(carboxylic acid-N-(ethoxy-carboyl)-amide)-3'-N-(2'',3'',5'',-tri-O-benzoyl-β-D-ribonfuranosyl)-amine-5α-androstane-17β-ol in 18 parts of ethyl acetate were refluxed with 1 part of triethylamine for 1 hour. The cooled solution was washed with diluted hydrochloric acid and water, dried and evaporated to a gum. This product was dissolved in methanol (10 parts) containing sodium methoxide and set aside for 24 hours. The solvent was removed in vacuo and the residue dissolved in water and methanol. The aqueous solution was treated with a basic lead acetate solution and the thus precipitated lead salt was centrifugated off, washed with a little water and methanol, then suspended in methanol and decomposed with hydrogen sulphide. Lead sulphide was removed and the solution evaporated to a crystalline residue. 0.095 part of 2',6'-dihydroxy-3'-β-D-ribofuranosyl-[3,2-d]-pyrimidine-5α-androstane-17β-ol were obtained.

*Example 35.—2',6'-dihydroxy-3'-(2'',3'',5''-tri-O-benzoyl-β-D-ribofuranosyl)-[3,2-d]-pyrimidine-5α-androstane-17β-ol-17-acetate*

2.8 parts of 2',6'-dihydroxy-3'-(2'',3'',5''-tri-O-benzoyl-β-D-ribofuranosyl)-[3,2-d]-pyrimidine-5α-androstane-17β-ol in 15 parts of pyridine were acetylated with 7 parts of acetic anhydride overnight at room temperature. The reaction mixture was diluted with water and filtered to give 2.91 parts of 2',6'-dihydroxy-3'(2'',3'',5''-tri-O-benzoyl-β-D-ribofuranosyl)-[3,2-d]-pyrimidine-5α-androstane-17β-ol-17-acetate.

*Example 36.—2'-hydroxy-6'-mercapto-3'-(2'',3'',5''-tri-O-benzoyl-β-D-ribofuranosyl)-[3,2-d]-pyrimidine-5α-androstane-17β-ol-17-acetate.*

A well-stirred mixture of 2.8 parts of 2',6'-dihydroxy-3'-(2'',3'',5''-tri-O-benzoyl-β-D-ribofuranosyl)-[3,2-d]-pyrimidine-5α-androstane-17β-ol-17-acetate and phosphorus pentasulphide (3.7 parts) in 70 parts of pyridine was treated dropwise with 0.19 part of water, and the turbid orange colored solution was heated at the reflux temperature for 7 hours. Approximately two-thirds of the pyridine was removed in vacuo and the remaining reaction mixture poured into 1 liter of vigorously stirred water. The suspension was filtered and the precipitate dissolved in methylene chloride. The solution filtered from some insoluble material was washed twice with 20 parts of water and the separated organic layer dried over sodium sulphate. After removal of the solvent in vacuo, the residue was crystallized from methanol to give 2.12 parts of 2'-hydroxy-6'-mercapto-3'-(2'',3'',5''-tri-O-benzoyl-β-D-ribofuranosyl)-[3,2-d]-pyrimidine-5α-androstane-17β-ol-17-acetate.

*Example 37.—2'-hydroxy-6'-amino-3'-β-D-ribofuranosyl-[3,2-d]-pyrimidine-5α-androstane-17β-ol*

0.95 part of 2'-hydroxy-6'-mercapto-3'(2'',3'',5''-tri-O-benzoyl-β-D-ribofuranosyl)-[3,2-d]-pyrimidine-5α-androstane-17β-ol-17-acetate were introduced into 25 parts of ethanolic ammonia solution saturated at 0° C., and the mixture was heated in a sealed tube at 120° C. for 48 hours. After cooling, the reaction mixturew as evaporated in vacuo to dryness, after which 20 parts of water and 8 parts of chloroform were poured on the residue. After shaking thoroughly, the aqueous layer was separated, shaken two additional times with 8 parts of chloroform each time, and evaporated in vacuo to dryness to give, after recrystallization from methanol, 0.24 part of 2'-hydroxy-6'-amino-3'-β-D-ribofuranosyl-[3,2-d]-pyrimidine-5α-androstane-17β-ol.

*Example 38.—2'-hydroxy-6'-methyl-amino-3'-β-D-ribofuranosyl-[3,2-d]-pyrimidine-5α-androstane-17β-ol*

A sealed tube containing 0.95 part of 2'-hydroxy-6'-mercapto-3'-(2'',3'',5''-tri-O-benzoyl-β-D-ribofuranosyl)-[3,2-d]-pyrimidine-5α-androstane-17β-ol-17-acetate and 35 parts of 45% methylamine in ethanol was heated at 120° C. for 48 hours. After cooling, the tube was opened and the solution was heated in accordance with Example 37 to give 0.21 parts of 2'-hydroxy-6'-methyl-amino-3'-β-D-ribofuranosyl-[3,2-d]-pyrimidine-5α-androstane-17β-ol.

*Example 39.—2'-mercapto-6'-hydroxy-3'-(2''-desoxy-β-D-ribofuranosyl)-[3,2-d]-pyrimidine-androst-4-ene-17β-ol*

0.5 part of N-2-[3-ethoxy-androsta-2,4-diene-17β-ol]-carboyl-N'-(3',5'-di-O-benzoyl-2'-desoxy-β-D-ribofuranosyl)-thiourea were refluxed for 1.30 hours in 150 parts of ethyl acetate and 3 parts of triethylamine. The reaction mixture was cooled, washed with N hydrochloric acid and water, dried, and evaporated in vacuo to a gum. When said gum was stirred with dry methanol, it rapidly crystallized. After recrystallization from methanol, 0.38 part of 2'-mercapto-6'-hydroxy-3'-(3'',5''-di-O-benzoyl-2''-desoxy-β-D-ribofuranosyl)-[3,2-d]-pyrimidine-androst-4-ene-17β-ol were obtained.

A solution of the thus obtained dibenzoate (0.3 part) in 25 parts of dry methanol containing sodium methoxide (1 part of a 1.8% solution in methanol) was refluxed for ten minutes and then set aside for 24 hours.

The clear, yellow coloured solution was neutralized with Zeokarb 225 and evaporated to dryness in vacuo.

12 parts of water and 4 parts of chloroform were poured on the residue. After shaking thoroughly, the aqueous layer was separated, shaken two additional times with 4 parts of chloroform each time, and evaporated in vacuo to dryness to give, after recrystallization from methanol, 0.091 part of 2'-mercapto - 6'-hydroxy - 3'- (2''-desoxy-β-D-ribofuranosyl) - [3,2-d]-pyrimidine-androst-4-ene-17β-ol.

*Example 40.—2'-mercapto - 6'-amino-3'-(2''-desoxy-β-D-ribofuranosyl)-[3,2-d]-pyrimidine-androst-4-ene-17β-ol*

0.83 part of 2'-mercapto - 6'-hydroxy - 3'-(3'',5''-di-O-benzoyl-2''-desoxy - β-D-ribofuranosyl) - [3,2-d]-pyrimidine-androst-4-ene-17β-ol in 4 parts of pyridine were acetylated with 2 parts of acetic anhydride at room temperature overnight. 0.82 part of 2'-mercapto-6'-hydroxy-3'- (3'',5''-di-O-benzoyl - 2''-desoxy-β-D-ribofuranosyl)-[3,2-d]-pyrimidine-androst - 4-ene-17β-ol-17-acetate were obtained, which (according to Example 36) were treated with $P_2S_5$ in pyrimidine to give 0.71 part of 2',6'dimercapto - 3'-(3'',5''-di-O-benzoyl - 2''-desoxy - β-D-ribofuranosyl) - [3,2-d]-pyrimidine-androst - 4-ene - 17β-ol-17-acetate.

The latter compound was treated with ethanolic ammonia according to Example 37 to give a non-crystallizable residue (0.26 part). Through careful chromatography on a powdered cellulose column, using butanol saturated with water as the solvent, a fraction ($R_f$ 0.58) consisting of 2'-mercapto - 6'-amino - 3'-(2''-desoxy - β-D-ribofuranosyl) - [3,2-d]-pyrimidine-androst - 4-ene - 17β-ol (0.12 part) and a fraction ($R_f$ 0.21) consisting of 2',6'-diamino - 3'-(2''-desoxy - β-D-ribofuranosyl) - [3,2-d]-pyrimidine-androst-4-ene-17β-ol (0.071 part) were separated.

*Example 41.—2'-methyl - 6'-dimethyl-amino - 3'-pentyl-[3,2-d]-pyrimidine-17α-methyl-5α-androstane-17β-ol*

A solution of 4 parts of 2-(carboxylic acid-N-acetyl-amide) - 3-N-n-pentyl-amine - 17α-methyl-androst-2-ene-17β-ol in 30 parts of ethylene glycol was refluxed for 2 hours to obtain, after dilution with water, filtration and crystallization from ethyl acetate, 3.72 parts of 2'-methyl-6'-hydroxy - 3'-pentyl - [3,2-d]-pyrimidine - 17α-methyl-5α-androstane-17β-ol. 3.5 parts of the latter compound were treated with $P_2S_5$ and pyridine (according to Example 16) to give 2.8 parts of 2'-methyl-6'-mercapto-3'-pentyl-[3,2-d]-pyrimidine - 17α-methyl - 5α-androstane-17β-ol, which, upon reacting with a 30% ethanol solution of dimethylamine (according to Example 38), yielded 2.1 parts of 2'-methyl - 6'-dimethyl-amino - 3'-pentyl-[3,2-d]-pyrimidine-17α-methyl-5α-androstane-17β-ol.

*Example 42.—2'-propyl-6'-amino-3'-butyl-[3,2-d] pyrimidine-cholestane*

A solution of 3 parts of 2-(carboxylic acid-N-butanoyl-amide)-3-N-butyl-amino-cholest-2-ene in 25 parts of ethylene glycol was refluxed (according to Example 41) to obtain 2.65 parts of 2'-propyl-6'-hydroxy-3'-butyl-[3,2-d]-pyrimidine-cholestane.

The latter compound (according to Example 16) was converted into 2' - propyl - 6' - mercapto-3'-butyl-[3,2-d]-pyrimidine-cholestane (1.93 parts) by reacting with $P_2S_5$ and pyridine, and then treated with ethanolic ammonia (according to Example 30) to give 2'-propyl-6'-amino-3'-butyl-[3,2-d]-pyrimidine-cholestane (1.23 parts).

*Example 43.—2',6'-dihydroxy-3'-(2''-desoxy-3'',5''-di-O-benzoyl-ribofuranosyl) - [3,2-d] - pyrimidine-androst-4-ene-17-ol*

0.65 part of N-2-[3-n-butoxy-androsta-2,4-diene-17β-ol] - carboyl - N' - [3'',5'' - di - O - benzoyl - β - D - 2'-desoxy-ribofuranosyl]-urea in 20 parts of ethyl acetate were refluxed for 2 hours with 1 part of tributylamine. The reaction mixture was cooled, washed with N hydrochloric acid and water, dried, and evaporated to dryness to give, after crystallization from methanol, 0.26 part of 2' - 6' - dihydroxy - 3' - (2'' - desoxy - 3'',5'' - di - O - benzoyl - ribofuranosyl) - [3,2 - d] - pyrimidine - androst - 4-ene - 17β - ol.

*Example 44.—6'-hydroxy-3'-n-butyl-[3,2-d]-pyrimidine-cholestane*

3.9 parts of 2'-mercapto-6'-hydroxy-3'-n-butyl-[3,2-d]-pyrimidine-cholestane (prepared similarly to the corresponding -4-ene-derivative starting with N-2-[3-n-butoxy-cholest-2-ene]-carboyl-thiourea) were dissolved while stirring in a hot mixture of 230 parts of ethanol and 30 parts of ammonium hydroxide ($d=0.88$). To the resulting solution, 1.1 parts of Raney-Ni$W_2$ were added and the mixture was refluxed for 5 hours on a water bath. Upon filtering and evaporating to dryness, the residue, through chromatography on silica gel, gave 1.37 parts of 6'-hydroxy-3'-n-butyl-[3,2-d]-pyrimidine-cholestane.

*Example 45.—2'-amino-6'-hydroxy-[3,2-d]-pyrimidine-cholest-4-ene*

0.85 part of 2'-mercapto-6'-hydroxy-[3,2-d]-pyrimidine-cholest-4-ene were treated in a sealed tube at 120° C. for 48 hours with 20 parts of ethanol saturated with ammonia at 0° C. The reaction mixture was evaporated to dryness and the residue, after crystallization from methanol, gave 0.41 part of 2'-amino-6'-hydroxy-[3,2-d]-pyrimidine-cholest-4-ene.

*Example 46.—2'-amino-6'-hydroxy-3'-n-butyl cholest-4-ene*

1.05 parts of 2'-mercapto-6'-hydroxy-3'-n-butyl-cholest-4-ene were treated according to the preceding example for 72 hours at 120° C. with ethanolic ammonia. The reaction mixture was then evaporated to dryness. Through chromatography on silica gel, from the 2:8 benzene:ethyl acetate fraction, 0.22 part of 2'-amino-6'-hydroxy-3'-n-butyl-cholest-4-ene were obtained.

*Example 47.—2'methyl-thio-6'-hydroxy-[3,2-d]-pyrimidine-cholestane*

1.2 parts of 2'-mercapto-6'-hydroxy-[3,2-d]-pyrimidine-cholestane were dissolved in 25 parts of methanol containing 0.15 part of sodium methoxide and 3 parts of water. To the mixture, 0.38 part of methyl iodide were added. The reaction mixture was kept in a sealed tube for 2 hours at 30° C. and then for 4 hours at 60° C., cooled, concentrated and extracted with methylene chloride. Through chromatography on silica gel, 0.65 part of 2' - methyl-thio-6'-hydroxy-[3,2-d]-pyrimidine-cholestane were obtained.

*Example 48.—2'-chloro-6'-hydroxy-[3,2-d]-pyrimidine-cholestane*

Following the procedure of Example 24, 0.35 part of 2'-amino-6'-hydroxy-[3,2-d]-pyrimidine - cholestane were converted into 2'-chloro-6'-hydroxy-[3,2-d]-pyrimidine-cholestane (0.091 part).

*Example 49.—2'-methoxy-6'-amino-[3,2-d]-pyrimidine-17α-methyl-5α-androstane-17β-ol*

To a solution of 0.8 part of 2'-hydroxy-6'-amino-[3,2-d]-pyrimidine-17α-methyl-5α-androstane - 17β - ol in 80 parts of anhydrous tetrahydrofuran, were added 15 parts of an ether solution of diazomethane in the presence of $BF_3$ etherate. The reaction mixture was kept at room temperature for 6 hours while stirring, concentrated in vacuo, diluted with ethyl acetate, washed with water and evaporated to dryness to give, after crystallization from ethyl acetate, 0.42 part of 2' - hydroxy-6'-amino-3'-methyl - [3,2 - d] - pyrimidine - 17α - methyl - 5α - androsta-17β-ol. The mother liquor was evaporated to dryness and, through chromatography on silica gel, 0.12 part of 2'-methoxy-6'-amino-[3,2-d]-pyrimidine-17α-methyl-5α-androstane-17β-ol were separated.

*Example 50.—2'-hydroxy-6'-methoxy-3'-pentyl-[3,2-d]-pyrimidine-5α-androstane-17β-ol*

The procedure of Example 49 was repeated starting with 1.3 parts of 2',6'-dihydroxy-3'-pentyl-[3,2-d]-pyrimidine-5α-androstane-17β-ol. From the residue, by crystallization from CH₂Cl₂-ethyl acetate, 0.73 part of 2'-6'-dihydroxy - 1' - methyl - 3' - pentyl - [3,2 - d] - pyrimidine - 5α - androstane - 17β - ol were obtained, and then through chromatography on a silica gel column, 0.097 part of 2-'hydroxy-6'-methoxy-3'-pentyl-[3,2-d]-pyrimidine-5α-androstane-17β-ol were separated.

*Example 51.—2',6'-dihydroxy-3'-β-D-ribofuranosyl-[3,2-d]-pyrimidine-cholestane*

Following the procedure of Example 33, 1.07 parts of 2',6' - dihydroxy - 3' - (2″,3″,5″ - tri - O - benzoyl - β - D-ribofuranosyl) - [3,2-d] - pyrimidine-cholestane were obtained starting with 2.1 parts of 2-(carboxylic acid-N-(ethoxy - carboyl)-amide)-cholestane-3-one. Upon following the procedure of Example 34, 0.6 part of said product gave 0.12 part of 2',6'-dihydroxy-3'-β-D-ribofuranosyl-[3,2-d]-pyrimidine-cholestane.

*Example 52.—2'-hydroxy-6'-amino-3'-β-D-(2″-desoxy)-ribofuranosyl-[3,2-d]-pyrimidine-cholest-4-ene*

Following the procedure of Example 37, 1.06 parts of 2' - hydroxy - 6' - amino - 3' - β - D - (2″ - desoxy) - ribofuranosyl-[3,2-d]-pyrimidine-cholest-4-ene were obtained starting with 2.5 parts of 2'-hydroxy-6'-mercapto-3'-β-D-(3″,5″ - di - O - benzoyl - 2″ - desoxy) - ribofuranosyl-[3,2-d]-pyrimidine-cholest-4-ene.

*Example 53.—1'-mercapto-6'-hydroxy-3'-β-D-ribofuranosyl-[3,2-d]-pyrimidine-5α-estrane-17β-ol*

Following the procedure of Example 39, 0.42 part of 2' - mercapto - 6'-hydroxy-3'-β-D-ribofuranosyl-[3,2-d-]-pyrimidine-5α-estrane-17β-ol were obtained starting with 1.8 parts of N-2-[3-n-butoxy-5α-estr-2-ene-17β-ol]-carboyl - N' - [2',3',5'-tri-O-benzoyl-β-D-ribofuranosyl]-thiourea.

*Example 54.—2' - hydroxy-6'-amino-3'-β-D-ribofuranosyl-[3,2-d]-5α-estrane-17β-ol*

Starting with 1.52 parts of 2'-hydroxy-6'-mercapto-3'-β-D - (2″,3″,5″ - tri-O-benzoyl)-ribofuranosyl-[3,2-d]-pyrimidine-5α-estrane-17β-ol-17-acetate, 0.32 part of 2'-hydroxy - 6'-amino-3'-β-D-ribofuranosyl-[3,2-d]-pyrimidine-5α-estrane-17β-ol were obtained.

*Example 55.—2',6' - dihydroxy-3'-β-D-(2″-desoxy)-ribofuranosyl-[3,2-d]-pyrimidine-5α-estrane-17β-ol*

Starting with 3.2 parts of 2-(carboxylic acid-N-(ethoxycarboyl)-amide)-5α-estrane-17β-ol-3-one and following the procedure of Example 33, using 3.12 parts of 3,5-di-O-benzoyl-2'-desoxy-β-D-ribofuranosyl-amine, 1.87 parts of 2',6' - dihydroxy - 3'-(3″,5″-di-O-benzoyl-2″-desoxy-β-D-ribofuranosyl)-[3,2-d]-pyrimidine-5α-estrane-17β-ol were obtained. The latter product was treated according to Example 34 to give 0.56 part of 2',6'-dihydroxy-3'-β-D-(2″ - desoxy) - ribofuranosyl-[3,2-d]-pyrimidine-5α-estrane-17β-ol.

What we claim is:
1. A compound of the formula:

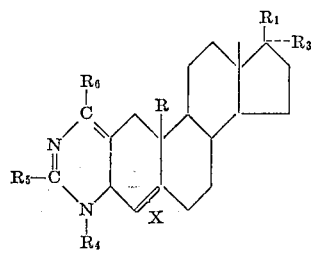

wherein R is a member selected from the group consisting of H and CH₃, R₁ is a member selected from the group consisting of C₈H₁₇ and OR₂ wherein R₂ is a member selected from the group consisting of hydrogen and acyl derived from an aliphatic acid of from 2 to 10 carbon atoms, R₃ is a member selected from the group consisting of hydrogen and lower alkyl, R₄ is a member selected from the group consisting of alkyl of from 1 to 6 carbon atoms, phenyl, glycosyl, ribosyl, 2'-desoxyribosyl, 2',3',5'-tri-O-benzoyl-ribosyl, and 3',5'-di-O-benzoyl-2'-desoxyribosyl, R₅ is a member selected from the group consisting of hydrogen, NH₂, OH, SH, Cl, S lower alkyl, O lower alkyl, lower alkyl and N (lower alkyl)₂, R₆ is a member selected from the group consisting of H, NH₂, SH, OH, Cl, O lower alkyl and N (lower alkyl)₂, and X is a member selected from the group consisting of single and double bonds.

2. A compound of the formula:

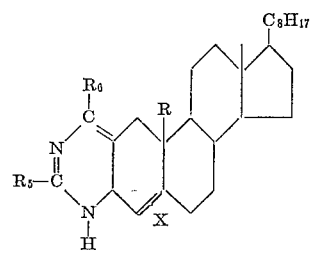

wherein R is a member selected from the group consisting of H and CH₃, R₅ is a member selected from the group consisting of hydrogen, NH₂, OH, SH, Cl, S lower alkyl, O lower alkyl, lower alkyl and N (lower alkyl)₂, R₆ is a member selected from the group consisting of H, NH₂, SH, OH, Cl, O lower alkyl and N (lower alkyl)₂, and X is a member selected from the group consisting of single and double bonds.

3. A compound of the formula:

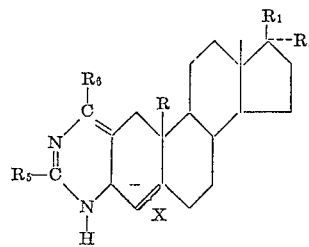

wherein R is a member selected from the group consisting of H and CH₃, R₁ is a member selected from the group consisting of C₈H₁₇ and OR₂ wherein R₂ is a member selected from the group consisting of hydrogen and acyl derived from an aliphatic acid of from 2 to 10 carbon atoms, R₃ is a member selected from the group consisting of hydrogen and lower alkyl, R₅ is a member selected from the group consisting of OH, SH, Cl, S lower alkyl, O lower alkyl and N (lower alkyl)₂, R₆ is a member selected from the group consisting of NH₂, SH, OH, Cl, O lower alkyl and N (lower alkyl)₂, and X is a member selected from the group consisting of single and double bonds.

4. 2',6' - dihydroxy - 3'-β-D-ribofuranosyl-[3,2-d]-pyrimidine-5α-androstane-17β-ol.

5. 2', - hydroxy - 6'-amino-3'-β-D-ribofuranosyl-[3,2-d]-pyrimidine-5α-androstane-17β-ol.

6. 2' - hydroxy - 6-dimethyl-amino-3'-β-D-ribofuranosyl-[3,2-d]-pyrimidine-5α-androstane-17β-ol.

7. 2' - mercapto - 6'-hydroxy-3'-(2″-desoxy-β-D-ribofuranosyl-[3,2-d]-pyrimidine-androst-4-ene-17β-ol.

8. 2' - mercapto - 6'-amino-3'-(2″-desoxy-β-D-ribofuranosyl)-[3,2-d]-pyrimidine-androst-4-ene-17β-ol.

9. 2',6' - diamino - 3'-(2″-desoxy-β-D-ribofuranosyl)-[3,2-d]-pyrimidine-androst-4-ene-17β-ol.

10. 2',6' - dihydroxy - 3'-β-D-ribofuranosyl-[3,2-d]-pyrimidine-cholestane.

11. 2' - hydroxy - 6'-amino-3'-β-D-(2''-desoxy)-ribofuranosyl-[3,2-d]-pyrimidine-cholest-4-ene.

12. 2' - mercapto - 6'-hydroxy-3'-β-D-ribofuranosyl-[3,2-d]-pyrimidine-5α-estrane-17β-ol.

13. 2' - hydroxy - 6'-amino-3'-β-D-ribofuranosyl-[3,2-d]-pyrimidine-5α-estrane-17β-ol.

14. 2'-6' - dihydroxy - 3'-β-D-(2''-desoxy)-ribofuranosyl-[3,2-d]-pyrimidine-5α-estrane-17β-ol.

References Cited by the Examiner

UNITED STATES PATENTS 2,999,092  9/1961  Colton et al. _____ 260—239.5
3,132,137  5/1964  Clinton _____ 260—239.5

OTHER REFERENCES

Ackerman et al., "Journal Med. Chem.," vol. 7, No. 2, March 1964, pp. 238–240.

Zderic et al., "Steroids," vol. 6, #2, March 1963, pp. 195–198.

LEWIS GOTTS, *Primary Examiner.*

JOHNNIE R. BROWN, *Assistant Examiner.*